United States Patent
Friend et al.

(10) Patent No.: US 10,701,206 B2
(45) Date of Patent: Jun. 30, 2020

(54) SYSTEM AND METHOD FOR CONTACT CENTER COMMUNICATIONS

(71) Applicant: Genesys Telecommunications Laboratories, Inc., Daly City, CA (US)

(72) Inventors: Benjamin Friend, Campbell, CA (US); Marat Irner, Santa Clara, CA (US); Christopher Connolly, North Bay Village, FL (US); Herbert Willi Artur Ristock, Walnut Creek, CA (US); Leonid Vymenets, Toronto (CA); Colin Leonard, Raleigh, NC (US); Vladimir Mezhibovsky, San Francisco, CA (US); Josef Eric Eisner, Larkspur, CA (US)

(*) Notice: Subject to any disclaimer, the term of this patent is extended or adjusted under 35 U.S.C. 154(b) by 357 days.

(21) Appl. No.: 15/201,246

(22) Filed: Jul. 1, 2016

(65) Prior Publication Data
US 2018/0004375 A1   Jan. 4, 2018

(51) Int. Cl.
G06F 3/0484 (2013.01)
H04M 3/51 (2006.01)
H04L 29/06 (2006.01)
G06F 3/0481 (2013.01)

(52) U.S. Cl.
CPC ........ *H04M 3/5166* (2013.01); *G06F 3/0481* (2013.01); *G06F 3/0484* (2013.01); *H04L 63/1441* (2013.01); *H04L 63/20* (2013.01); *H04M 3/5133* (2013.01); *H04M 2203/609* (2013.01); *H04M 2203/6081* (2013.01)

(58) Field of Classification Search
CPC ..... G06F 3/0484; G06F 3/0481; H04L 63/20; H04M 3/5133; H04M 3/5166; H04M 2203/609; H04M 2203/6081
See application file for complete search history.

(56) References Cited

U.S. PATENT DOCUMENTS

| | | | |
|---|---|---|---|
| 7,831,670 B2 | 11/2010 | Goodman et al. | |
| 8,104,044 B1 * | 1/2012 | Scofield | G06F 9/542 719/313 |
| 8,265,022 B2 | 9/2012 | Hans | |
| 8,387,121 B1 | 2/2013 | Surti | |
| 8,434,129 B2 | 4/2013 | Kannappan et al. | |
| 9,391,985 B2 | 7/2016 | Hefetz | |
| 9,747,141 B2 | 8/2017 | Caunter et al. | |
| 9,767,454 B1 | 9/2017 | Mohsenzadeh | |
| 2003/0158913 A1 | 8/2003 | Agnoli et al. | |
| 2004/0187133 A1 * | 9/2004 | Weisshaar | H04L 29/06 718/100 |
| 2007/0111708 A1 | 5/2007 | Dorenbosch | |

(Continued)

OTHER PUBLICATIONS

Zimmermann, P. et al., ZRTP: Media Path Key Agreement for Secure RTP draft-zimmermann-avt-zrtp-06, dated Mar. 11, 2008, 65 pages.

*Primary Examiner* — Tuyetlien T Tran

(57) ABSTRACT

A system can connect multiple disparate web products and services through a common interface. Each product can function with or without other plugins as the features are dynamic based on what plugins are available. Desktops for contact centers can provide dynamic adjustment for given usage contexts. Secure electronic communication between parties reduce exposure to a man-in-the-middle attack within a contact center deployment equipped with interactive voice response functionality.

19 Claims, 9 Drawing Sheets

(56) References Cited

U.S. PATENT DOCUMENTS

| | | |
|---|---|---|
| 2007/0141977 A1 | 6/2007 | O'Hanlon |
| 2007/0220275 A1 | 9/2007 | Heitzeberg et al. |
| 2008/0014939 A1 | 1/2008 | Chang |
| 2008/0205626 A1* | 8/2008 | Mandalia ............ H04M 3/5191 379/265.09 |
| 2011/0185406 A1 | 7/2011 | Hirson et al. |
| 2011/0316858 A1* | 12/2011 | Shen ................... G06F 3/04817 345/473 |
| 2012/0249555 A1 | 10/2012 | Chmiel et al. |
| 2013/0347129 A1 | 12/2013 | Samuelsson et al. |
| 2014/0282961 A1 | 9/2014 | Dorfman et al. |
| 2015/0163056 A1 | 6/2015 | Nix |
| 2015/0278496 A1 | 10/2015 | Wang et al. |
| 2016/0014120 A1 | 1/2016 | Liu et al. |
| 2016/0227592 A1 | 8/2016 | Potter et al. |
| 2016/0286003 A1 | 9/2016 | Pessis et al. |
| 2016/0299790 A1 | 10/2016 | Wagner et al. |
| 2017/0004832 A1 | 1/2017 | Du et al. |
| 2017/0090734 A1 | 3/2017 | Fitzpatrick |
| 2018/0007081 A1 | 1/2018 | Friend et al. |

\* cited by examiner

SYSTEM AND METHOD FOR CONTACT CENTER COMMUNICATIONS

BACKGROUND

Contact centers can include offices set up to handle large volumes of calls, emails, chats, texts, letters, and other interactions with customers. The contact centers can screen interactions, forward the interactions to someone qualified to handle them, and to log the interactions. Contact centers can be used by mail-order catalog organizations, telemarketing companies, computer product help desks, and any large organization that uses the telephones, etc. to sell or service products and services.

BRIEF DESCRIPTION OF THE DRAWINGS

In association with the following detailed description, reference is made to the accompanying drawings, where like numerals in different figures can refer to the same element.

DETAILED DESCRIPTION

In some embodiments, the systems and methods connect multiple disparate web products and services through a common interface. First and third parties can add new products seamlessly. In some embodiments, user interface (UI) products, e.g., plugins, including one or more of WebChat, Send Message, LiveAssist Menu, Sidebar, Offers, etc., share resources in different combinations. Each product can function with or without other plugins as the features are dynamic based on what plugins are available. In some embodiments, desktops for contact centers can provide dynamic adjustment for given usage contexts. In some embodiments, secure electronic communication between parties can require exchange of a secret for authentication or encryption. For example, the systems and methods can reduce exposure to a man-in-the-middle attack within a contact center deployment equipped with interactive voice response (IVR) functionality.

Figure 1:
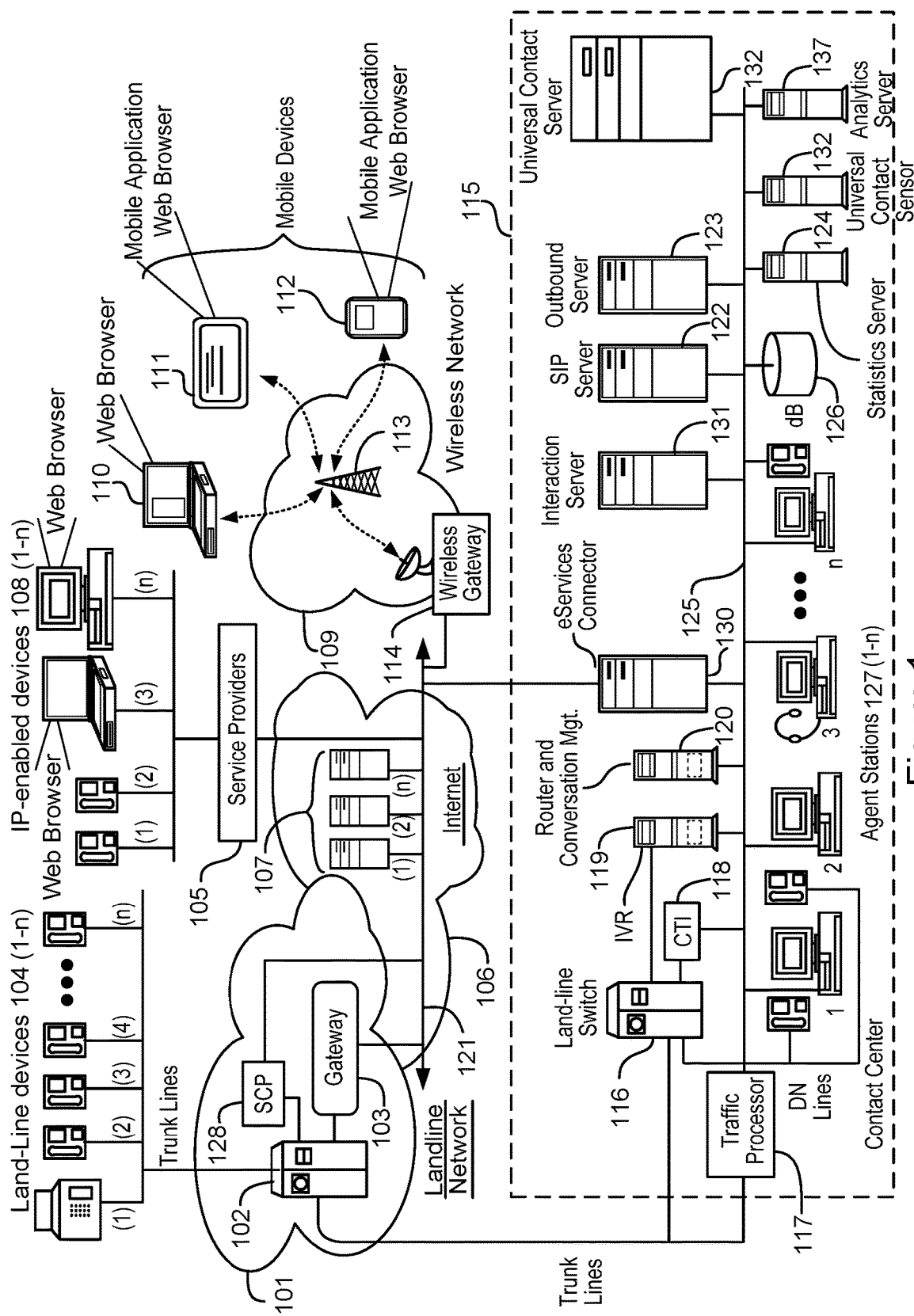
FIG. 1 is a block diagram of an exemplary architectural overview of a contact center.

FIG. 1 is a block diagram illustrating an example contact center 115 and a plurality of networks with interconnections where customers may interact with agents of the contact center. More or less of the modules discussed with the contact center 115 can be used, e.g., depending on an implementation. The modules can be located at the same physical location, at different physical locations, and/or virtually in a cloud, etc. The contact center 115 may be hosted by an enterprise and the enterprise may employ more than one contact center. Customers and agents may interact with contact center 115 through communication appliances such as land-line devices, e.g., telephones and facsimile machines 104 (1-n), IP-enabled devices 108 (1-n), e.g., laptop or desktop computer and IP-enabled phones, through mobile devices 110, 111 or 112, e.g., mobile phones, smart phones, personal digital assistants, tablets, etc. Interactions may include voice, text interaction, email, messaging services chat, facsimiles, mailed letters, and so on.

In one example of a contact center 115, interactions through land-line devices 104 may connect over trunk lines as shown to a network switch 102. Switch 102 may interact with hardware and software of a Service Control Point (SCP) 128, which may execute intelligent operations to determine to connect an incoming call or facsimiles to different ones of possible contact centers, or to agents operating as a remote agent outside a contact center premises. Incoming calls and facsimiles in some circumstances may also be routed through a gateway 103 into the Internet network 106 as packet-switched calls. The interconnections in the Internet are represented by backbone 121. In this circumstance such a call may be further processed as a packet-switched IP call. Equipment providing SCP services may also connect to the Internet and may allow SCP functionality to be integrated with Internet-connected servers and intelligence at contact centers.

A call from a land-line device 104 connecting to switch 102 may be routed to contact center 115 via trunk lines as shown to either a land-line switch 116 in contact center 115 or to a Traffic Processor 117. A contact center 115 may operate with the land-line switch or the traffic processor, but in some circumstances may employ both incoming paths. Traffic processor 117 may provide Session Border Control (SBC) functionality, may operate as a Media Gateway, or as a Softswitch.

Interactions through IP-enabled devices 108 (1-n) may occur through the Internet network via backbone 121, enabled by a variety of service providers 105 which operate to provide Internet service for such devices. Devices 102(1) and 102(2) may be IP-enabled telephones, operating under a protocol such as Session Initiation protocol (SIP). Appliance 108(3) is illustrated as a lap-top computer, which may be enabled by software for voice communication over packet networks such as the Internet, and may also interact in many other ways, depending on installed and operable software, such as Skype™ or other VoIP solutions based on technologies such as WebRTC. Similarly appliance 108(n) illustrated as a desktop computer, may interact over the Internet in much the same manner as laptop appliance 108(3).

Many IP-enabled devices provide capability for users to interact both in voice interactions and text interactions, such as email and text messaging services and protocols. Internet 106 may include a great variety of Internet-connected servers 107 and IP-enabled devices with Internet access may connect to individual ones of such servers to access services provided. Servers 107 in the Internet may include email servers, text messaging servers, social networking servers, Voice over IP servers (VoIP), and many more, many of which users may leverage in interaction with a contact center such as contact center 115.

Another arrangement to interact with contact centers is through mobile devices, illustrated in FIG. 1 by devices 110, 111 and 112. Such mobile devices may include, but are not limited to laptop computers, tablet devices and smart telephones. Such devices are not limited by a land-line connection or by a hard-wired Internet connection as shown for land-line devices 104 or IP-enabled devices 108, and may be used by customers and agents from changing geographic locations and while in motion. Devices 110, 111 and 112 are illustrated in FIG. 1 as connecting through a wireless network 109, which may occur in various ways, e.g., through Wi-Fi and/or individual ones of cell towers 113 associated with base stations having gateways such as gateway 114 illustrated, the gateways connected to Internet backbone 121, etc.

In some circumstances mobile devices such as devices 110, 111 and 112 may connect to supplemental equipment operable in a moving vehicle. For example, cellular smartphones may be enabled for near-field communication such as Bluetooth™, and may be paired with equipment in an automobile, which may in turn connect to the Internet network through satellite equipment and services, such as On-Star™. Wireless communication may be provided as well in aircraft, which may provide an on-board base station, which may connect wirelessly to the Internet through either a series of ground stations over which an aircraft may pass in flight, or through one or more satellites.

Regardless of the variety of ways that Internet access may be attained by mobile devices, users of these devices may leverage Internet-connected servers for a great variety of services, or may connect through the Internet more directly to a contact center such as contact center 115, where users may interact as customers or as agents of the contact center.

Contact center 115, as described above, may represent one of a plurality of federated contact centers, a single center hosted by a single enterprise, a single contact center operating on behalf of a plurality of host enterprises, or any one of a variety of other arrangements. Architecture of an individual contact center 115 may also vary considerably, and not all variations may be illustrated in a single diagram, e.g., FIG. 1. The architecture and interconnectivity illustrated in FIG. 1 is exemplary.

Equipment in a contact center such as contact center 115 may be interconnected through a local area network (LAN) 125. Land-line calls may arrive at a land-line switch 116 over trunk lines as shown from land-line network 101. There are a wide variety of land-line switches such as switch 116, and not all have the same functionality. Functionality may be enhanced by use of computer-telephony integration (CTI), which may be provided by a CTI server 118, which may note arriving calls, and may interact with other service units connected to LAN 125 to route the calls to agents connected to LAN 125, or in some circumstances may route calls to individual ones of remote agents who may be using any of land-line devices 104, IP-enabled devices 108 or mobile devices represented by devices 110, 111 or 112. The CTI server 118 can be implemented with a GENESYS TELECOMMUNICATIONS SYSTEMS, INC. T-server. Calls may be queued in any one of a variety of ways before connection to an agent, either locally-based or remote from the contact center, depending on circumstances.

Incoming land-line calls to switch 116 may also be connected to the interactive voice response (IVR) server 119, which may serve to ascertain a purpose of the caller and other information useful in further routing of the call to final connection, if further routing is needed. A router and conversation manager server 120 may be leveraged for routing intelligence, of which there may be a great variety, and for association of the instant call with previous calls or future calls that might be made. The router and conversation manager server 120 can be mapped to a GENESYS TELECOMMUNICATIONS SYSTEMS, INC. orchestration server 133, a universal routing server (URS) and conversation manager. The IVR 119 can also be used during outbound call campaigns.

Land-line calls thusly treated may be connected to agents at agent stations 127(1) or 127(2), each of which is shown as comprising a land-line telephone connected to switch 116 by directory number (DN) lines. Such calls may also be connected to remote agents using land-line telephones back through the land-line network. Such remote agents may also have computing appliances connected to contact center 115 for interaction with agent services such as scripting through an agent desktop application, also used by agents at agent stations 127(1-n).

Incoming calls from land-line network 101 may alternatively be connected in contact center 115 through Traffic Processor 117, described briefly above, to LAN 125. In some circumstances Traffic Processor 117 may convert incoming calls to SIP protocol, and such calls may be further managed by SIP Server 122.

Incoming calls from IP-enabled devices 108 or from mobile devices 110, 111 or 112 can be handled by the SIP Server 122, and a wide variety of text-based electronic communications, e.g., chat, email, texting, social media, etc., may come to contact center 115 through the Internet, arriving in the contact center at an eServices Connector 130. eServices Connector 130 may provide protective functions, such as a firewall may provide in other architecture, and may serve to direct incoming transactions to appropriate service servers. Text-based transactions may be directed to an Interaction Server 131, which may manage email, chat sessions, Short Message Service (SMS) transactions, co-browsing sessions, and more.

The Interaction Server 131 may leverage services of other servers in the contact center, and remotely as well. For example, SMS and email can be supported by a universal contact server 132 which interfaces with a database to store data on contacts, e.g., customers, including customer profiles and interaction history. The customer profile can include information about a level of service that the customer's interactions are to receive, e.g., for distinguishing a customer interaction (gold/silver/bronze) a particular interaction belongs to. The orchestration server 133 is the session-based routing component that takes core capability of routing and extends it, generalizes it, and integrates it with other components.

A workforce management server 135 of the contact center 15 can help manage the agent stations 127(1-n) to ensure the right resources are in place at the right time to handle customer interactions and work items that the Interaction Server 131 sends to the agent stations 127(1-n), in an appropriate way. The orchestration server 133 can assign interactions and other work items to agents. The workforce management server 135 can schedule agents for activities, e.g., schedule an agent to process email on mortgages from 1-2 pm on Wednesdays. The workforce management server 135 helps ensure that agents that are skilled at handling the particular types of interaction (e.g., voice, email, chat, web, etc.) are available at the right times so that the enterprise can provide a good experience for the customers. The workforce management server 135 can provide for forecasting, scheduling and tracking to get the most from available agents, e.g., based on service level objectives, employee contracts and preferences.

An analytics server 137 of the contact center 15 can include one or more processors, e.g., for interaction recording, e.g., between customers and agents, speech, text, chat, etc. analytics, and quality management, etc. In one example, the analytics server 137 can analyze recorded interactions with contact center agents to classify the recorded interactions and generate evaluation forms based on the interactions. Additionally, recording can be a service on its own, not limited for use in analytics, e.g., for compliance reasons, etc.

Agent station 127(3) is illustrated as having a connected headset from a computing device, which may execute telephony software to interact with packet switched calls. Agent station 127(n) is illustrated as having an IP-enable telephone connected to LAN 125, through which an agent at that station may connect to packet-switched calls. Every agent station may have a computerized appliance executing software to enable the using agent to transact by voice, email, chat, instant messaging, and any other communication process.

A statistics server 124 is illustrated in contact center 115, connected to LAN 125, and may provide a variety of services to agents operating in the contact center, and in some circumstances to customers of the contact center. Statistics may be used in contact center management to vary functionality in routing intelligence, load management, and in many other ways. A database dB may be provided to archive interaction data and to provide storage for many of the activities in contact center 115. An outbound server 123 is illustrated and may be used to manage outbound calls in the contact center 115, where calls may be made to aid the authentication process, and answered calls may be connected directly or be queued to be connected to agents involved in the outbound calls.

As described above, contact center 115, and the architecture and connectivity of the networks through which transaction is accomplished between customers and agents is exemplary, and there are a variety of ways that similar functionality might be attained with somewhat different architecture. The architecture illustrated is exemplary.

Contact centers 115 may operate with a wide variety of media channels for interaction with customers who call in to the centers. Such channels may enable voice interaction in some instances, and in other instances text-based interaction, which may include chat sessions, email exchanges, and text messaging, etc.

Figure 2:
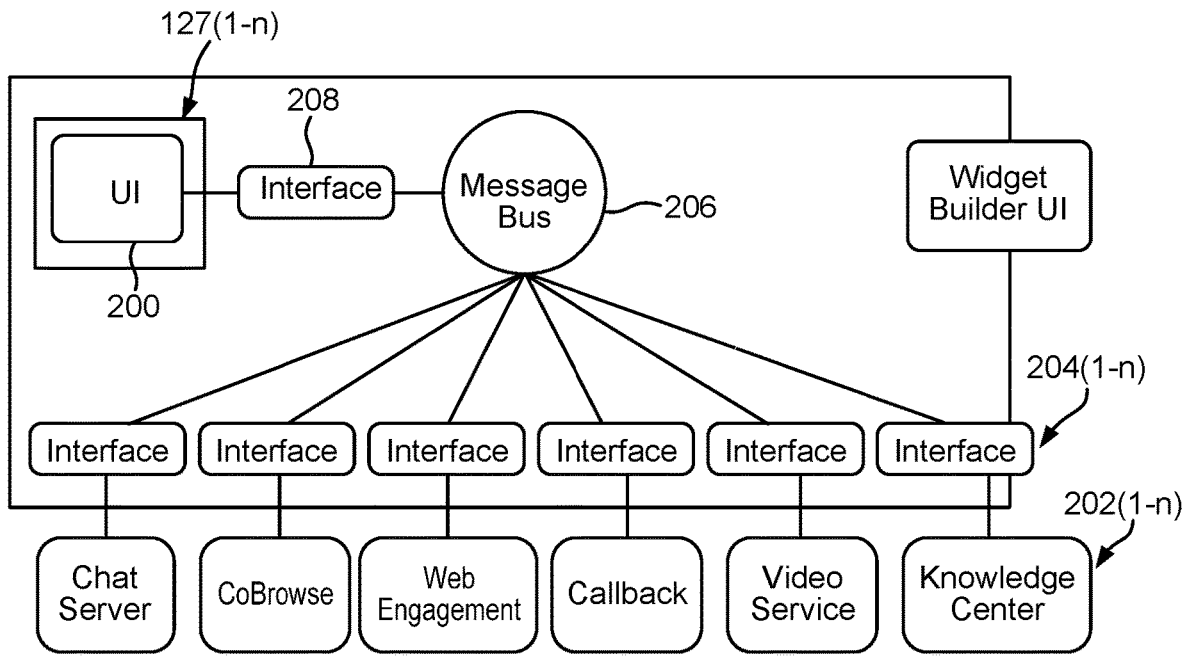
FIG. 2 is a block diagram of an example architecture for providing widgets to agent stations.

FIG. 2 is a block diagram of an example architecture for providing widgets 202(1-n) to customers and/or agent stations 127(1-n). The customer browser and agent stations 127(1-n) can display a user interface (UI) 200 via websites. The UI 200 allows for the customers and agent stations 127(1-n) to interact with a variety of widgets 202(1-n). A non-limiting list of the widgets 202(1-n) can include one or more of a chat server, co-browser, web engagement, call us, callback, chat, video services, knowledge center search, proactive engagement, send message, e.g., email, live assist menu with estimated wait time, sidebar, offers, etc. The widgets 202(1-n) can provide for various types of experiences to the customers and agent stations 127(1-n). More or less types of widgets 202(1-n) are possible, e.g., depending on an implementation. A widget builder UI 210 can aid with developing widgets 202(1-n) for the UI 200. The UI 200 can implement the widgets 202(1-n) over the widgets 202(1-n) respective interfaces 204(1-n). The UI 200 includes a message bus 206 to control connections of the UI 200 with the widgets 202(1-n). The UI 200 and the message bus 206 can connect via an interface 208. In one example, the message bus 206 is a universal communication bus that exposes application programming interfaces (API) over a middleware type layer. The message bus can provide flexibility to the UI 200, e.g., in a deployment and an integration of the variety of widgets 202(1-n), that can include their own business logic, over a diversity of websites, as the appearance of simple UI plugins. In general, the message bus 206 can package and share resources in different combinations of the widgets 202(1-n), or other products and service, e.g., for sharing resources between agent stations 127(1-n) at the contact center 115, between the contact center 115 and customers, etc. The widgets 202(1-n) can function with or without other plugins, and their features can be dynamically based on what plugins are available on the message bus 206.

In this way, the message bus 206 can connect multiple, disparate web products and services to the UI 200. In some embodiments, the message bus 206 can connect products and services other than the widgets 202(1-n) to the UI 200, and the widgets 220(1-n) need not ever connect through the message bus 206. The widgets 202(1-n) and the message bus 206 are described together herein for the sake of explanation. In some embodiments, the message bus 206 can listen for events to invoke commands to extend or change functionality of the widgets 202(1-n), e.g., based on interactions of the agent stations 127(1-n) and/or the customer. The message bus 206 can also allow first and third parties to add new widgets 202(1-n) or other products seamlessly to the customers and/or agent station 127(1-n). The message bus 206 allows the customers and/or agent station 127(1-n) to easily extend features and applications for integration with the contact center 115, independent of the system used. In this way, the message bus 206 can offer plug-and-play applications and extensions to the agent station 127(1-n), or other types of stations. The message bus 206 can execute on a variety of devices, including desktop and mobile, can support third party proxy service connections, e.g., Apigee™ proxy connections, and provide for flexible licensing.

The message bus 206 can include an asynchronous front-end publish and subscribe bus that allows the UI 200 and widgets 202(1-n) to communicate and/or cooperate by registering their API's on the message bus 206. Additional or alternative to acting as a layer between the server and the front-end, the message bus 206 can be used purely on the server to provide communication between different components on the server. In one embodiment, the message bus 206 includes a plugin architecture operating in the JavaScript asynchronous module definition (AMD) environment which provides the API for determining code modules and their dependencies, and loading them asynchronously. While JavaScript is used for the sake of explanation, additionally or alternatively, the architecture can used for native applications, web applications, non-digital applications, e.g., audible widgets, etc. The architecture can include one or more of consolidated global configuration objects, shared UI components and styles, utilities and common functions, micro-UI controllers, window managers, e.g., to position and display logic for widgets, dock view, overlay modals, full screen, utilities, e.g., for first and third party plugin developers, webchat service tester, and watchman, etc. Plugin package contents includes one or more of hypertext markup language (HTML) files, cascading style sheet (CSS)/less files, localization strings, JavaScript Controller, and JavaScript resources. Packing and initialization includes one or more of custom bundles to match licensing, complete bundles with runtime plugin selection, order of initialization, required core plugins, optional licensed plugins, and customer-defined plugins. Customer defined plugins include one or more of customer built plugins to seamlessly integrate with widgets 202(1-n), plugin utilities and services available to customers, and service plugins to replace any of widgets 202(1-n).

In some embodiments, the message bus 206 can connect JavaScript products together with minimal effort and without restricting development creativity. Each component may register a unique namespace on the bus to register commands for other plugins to call, call commands from other plugins, subscribe to published events on the bus, and publish their own events. With an API of the message bus 206, commands and events are asynchronous. Metadata provided when commands are called can include a namespace that called the command and a timestamp. Metadata provided in events includes namespace that published event, a timestamp and arbitrary data. The message bus 206 can call commands and subscribe to events that do not exist without runtime exceptions. The hooks work whenever the corresponding commands and events are registered on the message bus 206. The message bus 206 can define exception and warning responses for each command. In some embodiments, a permission-based API allows only specific namespaces to call your commands or provide different responses based on namespace. Auto re-publish allows to configure the event so that any new subscriber immediately receives the previously published event if the plugin publishes an event before another plugin has subscribed to it. Full logging of message bus 206 activity can be used for reporting. Existing JavaScript products can expose its API over the message bus 206 without modifying or rewriting its existing traditional API, allowing for dual API. This allows existing products to work with other products using the message bus 206.

Advantages of the message bus 206 can include data subscriptions in which each component can store and modify data on the bus, other components can subscribe to this data, on data change and on data is equal to, and state flags, counters, etc. In some embodiments, minified file size may be reduced from about 12 KB to 8 KB, optimized code for minification, and including a data subscription. The message bus 206 can be general purpose, provide for flexible implementation, lightweight (source: 14 KB, minified: 11 KB, gzipped: 3 KB), configurable, asynchronous, proven in production, provide managed development and maintenance, and provide a universal way for many JavaScript products to communicate. Implementations include a widget bus for connecting a multitude of different UI 200 components together, a service bus to expose an API to communicate with back-end services, and/or a monolithic application to orchestrate business logic of multi-pane applications.

The message bus 206 can be used in any front-end Javascript product/framework or on the server-side using NodeJS and register unique plugin namespaces on the bus. In some embodiments, namespaces cannot be changed or overwritten or duplicated. In some embodiments, the message bus can automatically republish certain events to new subscribers after initial publication has occurred, for example, a "ready" event. The message bus 206 provides support for permissions on commands, e.g., restrict invocation of commands to only approved plugins via namespace filtering. Commands can use deferred objects and respond with a resolve or reject status rather than a traditional return value. This allows for distinct error messages and data to be returned if there is an issue. In the resolved state, arbitrary data can be returned as function arguments.

The message bus 206 may not throw exceptions or stop execution when invoking commands or subscribing to events not available on the message bus 206, unlike traditional JavaScript APIs. For example, with indirect hooks, the message bus 206 can call commands and subscribe to events that do not exist without runtime exceptions. The hooks will work whenever the corresponding commands and events are registered on the message bus 206. When commands/events are not yet registered, the message bus 206 can provide a response which can be understood by the client, e.g., "service not available." Additionally or alternatively, determined exception and warning responses can be provided for each command.

The UI 200 can subscribe to events before the related plugin is registered to allow for being notified when a new plugin is initialized on the message bus 206. This allows for plugins to be developed with support for later plugins ahead of time. Once the new plugin is released, they can automatically interface. In some embodiments, the UI 200 allows for full logging of all activity on the message bus 206 which is recordable and usable for reporting. Namespace prefixes can be customizable.

Figure 3:
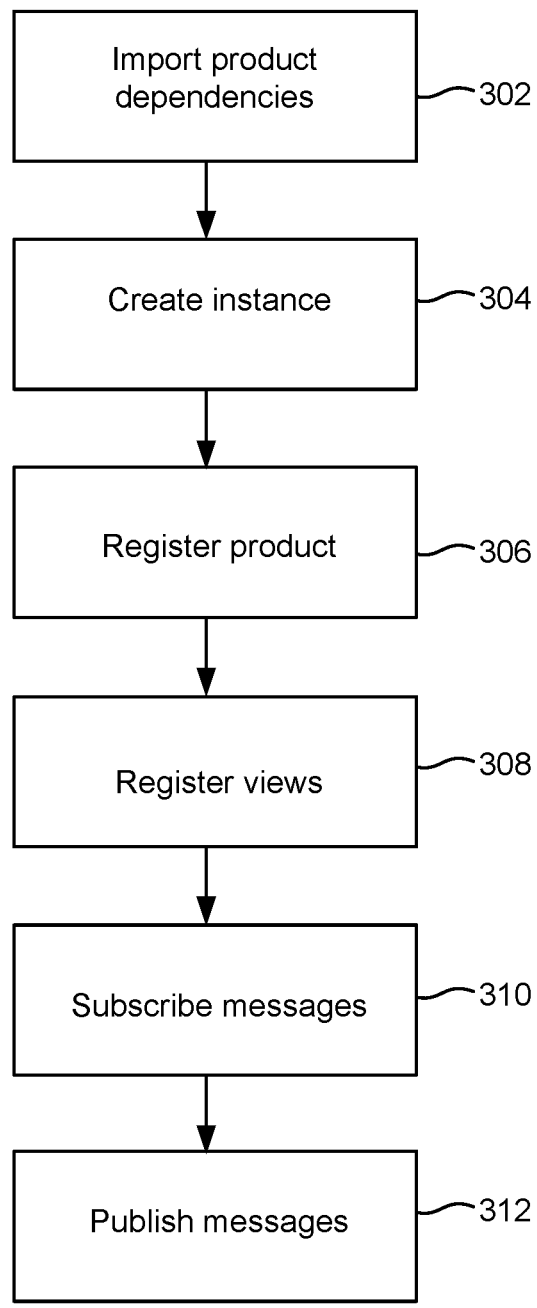
FIG. 3 is a flowchart of an example logic for providing widget access to the UI through the message bus.

FIG. 3 is a flowchart 300 of an example logic for providing widget 202(1-n) access to the UI 200 through the message bus 206. The message bus 206 can use a publish/subscribe protocol to tie together widgets 202(1-n), and/or other products. Each widget 202(1-n) includes an interface 204(1-n) to send/receive messages through the message bus 206 on behalf of the widget 202(1-n). For the sake of explanation a webchat widget is described. A similar logic can be applied to other widgets 202(1-n) and types of products/services. In this example, the message bus 206 imports webchat dependencies and creates a webchat instance (302). The message bus 206 checks for the existence of both the webchat product and webchat configuration and creates an instance of the webchat product, if available (304). The UI 200 can display a message that the product is not available if the product or configuration does not exist through the message bus 206. The message bus 206 registers webchat, e.g., the product, with the UI 200 using a namespace, e.g., "cx.webchat". This returns a product helper object, e.g., an object that configures and registers the product with the UI 200.

The message bus 206 registers views for the widget 202(1-n), e.g., HTML templates, to be shown in the different standard views of the UI 200 (308). The view can include an overlay, toolbar, etc. This generates unique namespaces for each view. The widget 202(1-n) subscribes to messages on the message bus 206 and the message bus 206 sets up actions to trigger when the message is received (310). The widget 202(1-n) publishes messages to the message bus 206, e.g., messages based on events exposed on the webchat product (312). The message bus 206 returns the product helper object. For example, webchat can be configured to open and close based on messages coming over the message bus 206. If the message "cx.webchat.open" comes over the message bus 206, the message bus 206 interprets the message as a command by the interface 204(1-n) for webchat, which then requests the UI 200 to show a main overlay view, e.g., on the customer browser and/or the agent station 127(1-n). Alternately, if "cx.webchat.close" comes over the message bus 206, the UI 200 is asked to close the main webchat overlay.

In this way, the message bus 206 provides for communication, data exchange, and navigation control between widgets 202(1-*n*). Each widget 202(1-*n*) can include commands, events, configuration items, and localization strings. The message bus 206 can execute in a browser, e.g., Chrome, Firefox, Explorer, etc. Permissions can be static or dynamic, driven by information from one or both of the client and contact center servers. An advertisement engine can supply advertisements for display to the UI 200. While functionality can be stored in JavaScript cache local to the client, newer versions can be loaded from the servers, e.g., including a tag/timestamp to distinguish between versions. For customer browsers and/or agent stations 127(1-*n*), updated JavaScript at the client side can be through routing checks. Local SCP 128 functions can be included, e.g. for overlay dialers. For generic contact requests, e.g., no media specified, media can be chosen by contact center servers. The message bus 206 can be dynamically integrated with vendor relationship management (VRM), private or shared, e.g. to share experiences on best widgets 202(1-*n*) for conducting communications with given contact centers 115.

Figure 4:
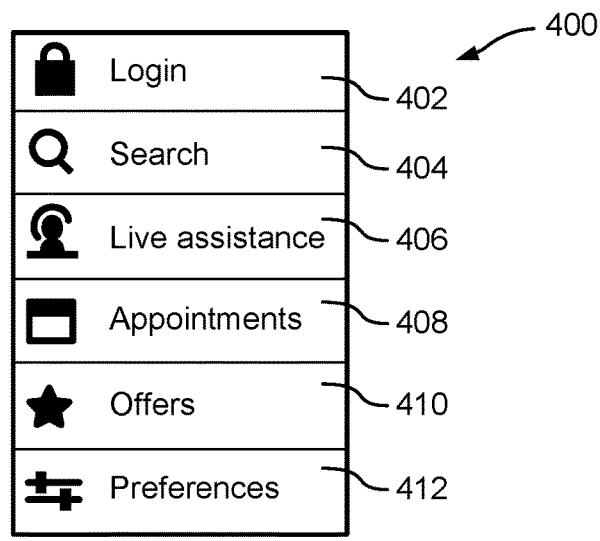
FIG. 4 is a screenshot of an example login screen of a login widget displayed by the UI.

FIG. 4 is a screenshot of an example login screen 400 of a login widget 202(1-*n*) displayed by the UI 200. The customer can interact with various buttons of the login screen 400, e.g., to access different functions. For example, the UI 200 can provide the customer access to login 402, search 404, request live assistance 406, check appointments 408, check offers 410, and change preferences 412. Clicking a button can open a new widget 202(1-*n*) related to that button, e.g., a live assistance widget 500.

Figure 5:
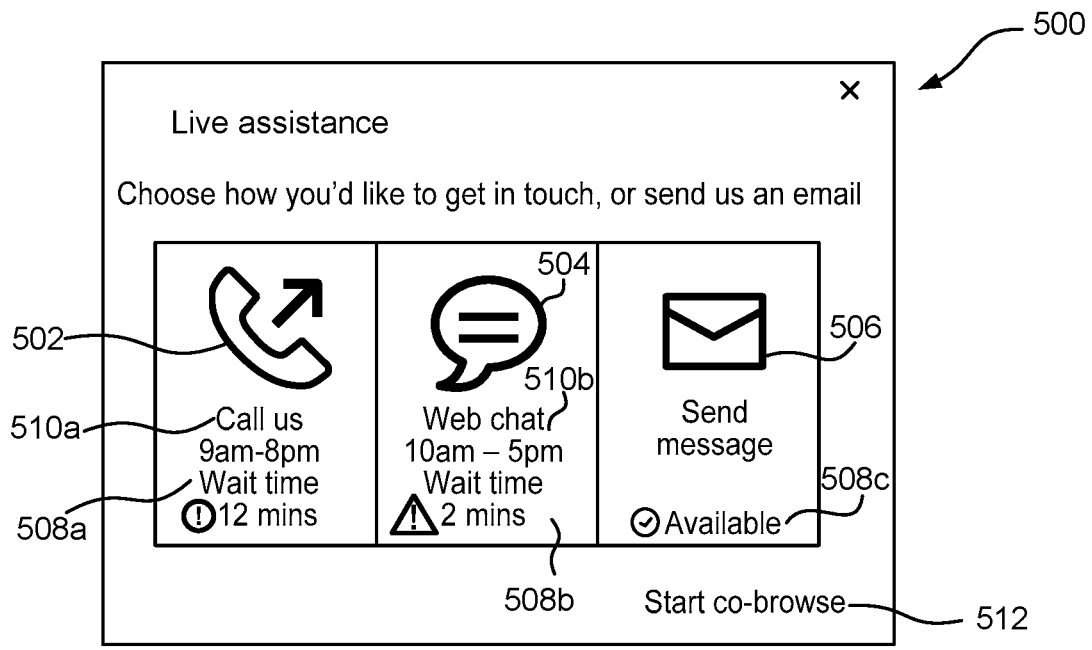
FIG. 5 is a screenshot of an example live assistance screen of a live assistance widget displayed by the UI.

FIG. 5 is a screenshot of an example live assistance screen 500 of a live assistance widget 202(1-*n*) displayed by the UI 200. The live assistance screen 500 can provide the customer options for interacting with the agent stations 127(1-*n*), e.g., call 502, webchat 504, send a message 506, etc. The live assistance screen 500 can also display other information related to the assistance, e.g., a wait time 508*a-c* for each type of interaction to interact with the agent station 127(1-*n*), and/or a time of operation 510*a-b* of the agent stations 127(1-*n*). The customer can also start a co-browse 512 session during the live assistance.

Figure 6:
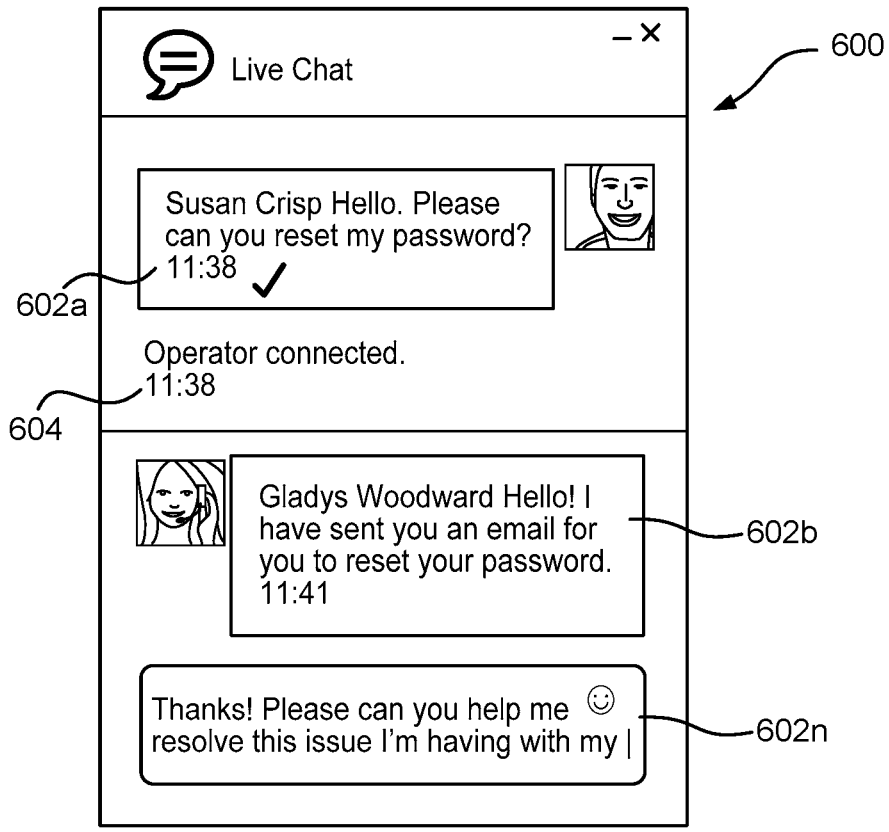
FIG. 6 is a screenshot of an example live chat screen of a live chat widget by the UI.

FIG. 6 is a screenshot of an example live chat screen 600 of a live chat widget 202(1-*n*) displayed by the UI 200. The live chat screen 600 can provide fields 602*a-n* for entering text, images, attachments, etc., e.g., to provide a conversation between the customer and the agent station 127(1-*n*). The live chat screen 600 can also supply information 604 to the customer, e.g., that an operator is connected.

Figure 7:
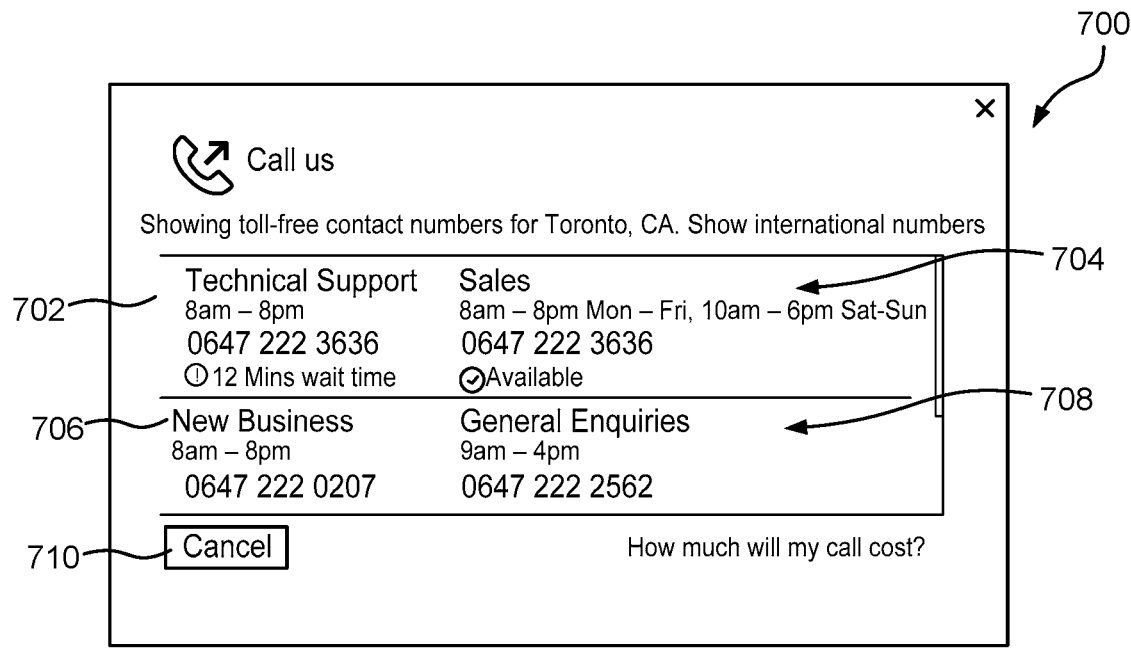
FIG. 7 is a screenshot of an example call screen of a call widget displayed by the UI.

FIG. 7 is a screenshot of an example call screen 700 of a call widget 202(1-*n*) displayed by the UI 200. The call screen 700 can include telephone numbers, hours of operation, and wait time for each of technical support 702, sales 704, new business 706 and general enquiries 708. More or less types of call numbers can be included, e.g., based on an implementation. With the message bus 206 managing connections to the widgets 202(1-*n*), the information, views, structure, etc. can be easy be updated and/or changed for any of the widgets 202(1-*n*). A cancel button 710 can be provided to cancel the call 700.

Figure 8:
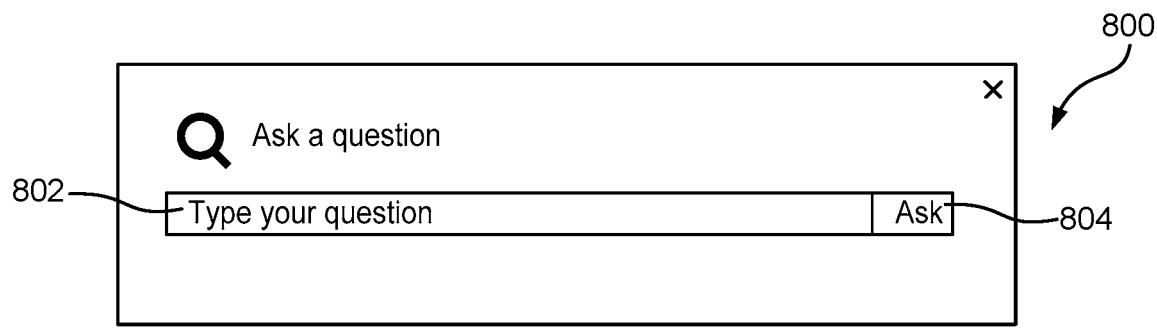
FIG. 8 is a screenshot of an example query screen for an ask a question widget displayed by the UI.

FIG. 8 is a screenshot of an example query screen 800 of an ask a question widget 202(1-*n*) displayed by the UI 200. The query screen 800 can include a field for the customer to enter a question of the agent stations 127(1-*n*), and an ask button 804 to send the question to the agent station 127(1-*n*).

Figure 9:
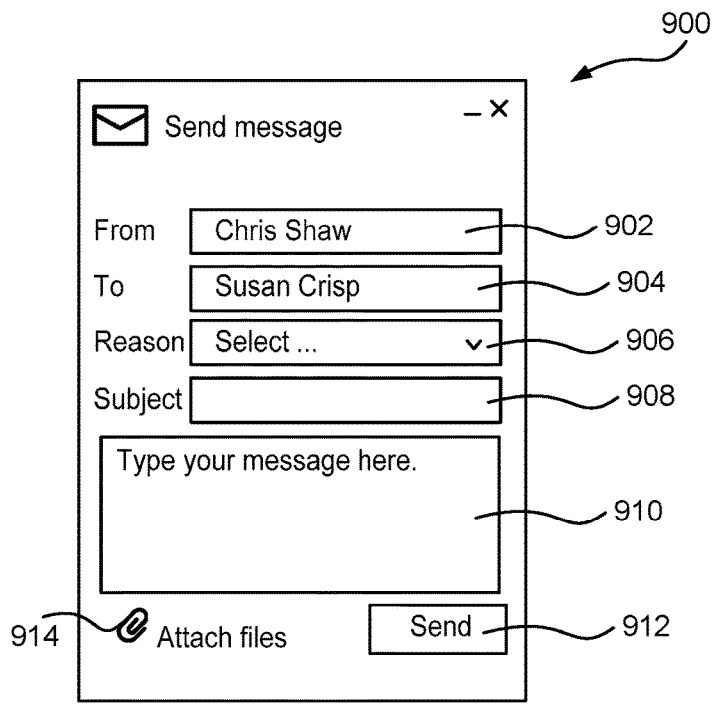
FIG. 9 is a screenshot of an example message screen for a send message widget displayed by the UI.

FIG. 9 is a screenshot of an example message screen 900 of a send message widget 202(1-*n*) displayed by the UI 200. The message screen 900 can include fields to enter a name that the message is from 902, a name that the message is to 904, a reason for the message 906, which can include dropdown option to choose from, a subject 908, an area 910 to type the message, a send button 912 for sending the message, and an attachment icon 914 for attaching files to the message. More or less fields can be included.

Figure 10:
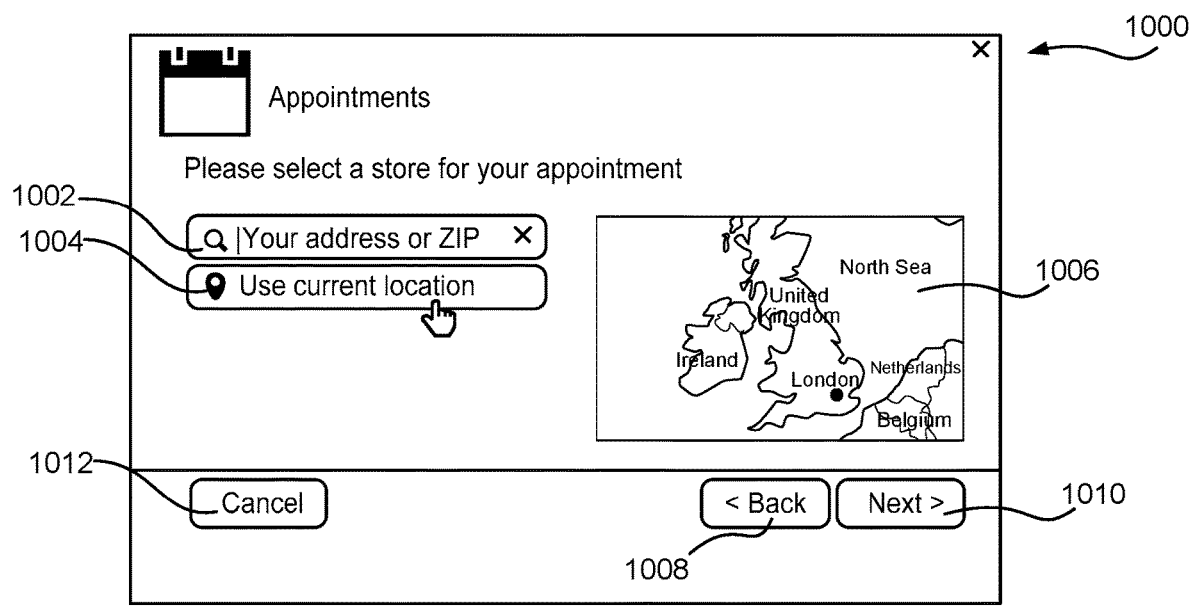
FIG. 10 is a screenshot of an example appointment screen of an appointment widget displayed by the UI.

FIG. 10 is a screenshot of an example appointment screen 1000 of an appointment widget 202(1-*n*) displayed by the UI 200. The appointment screen 1000 can allow the customer to set up an appointment with a product or service provider, e.g., at a store of the provider located near the customer. The appointment screen 1000 can include one or more of a search field 1002 for entering an address or zip code of a location of the customer to find a nearest store or stores. The customer can also click a use current location field 1004 to find the nearest store(s). A map 1006 can display a location of the nearest store(s) and provide directions to the customer. The customer can navigate through different appointment screens 1000 using the back button 1008 or next button 1010. The customer can cancel the search for an appointment using the cancel button 1012.

Figure 11:
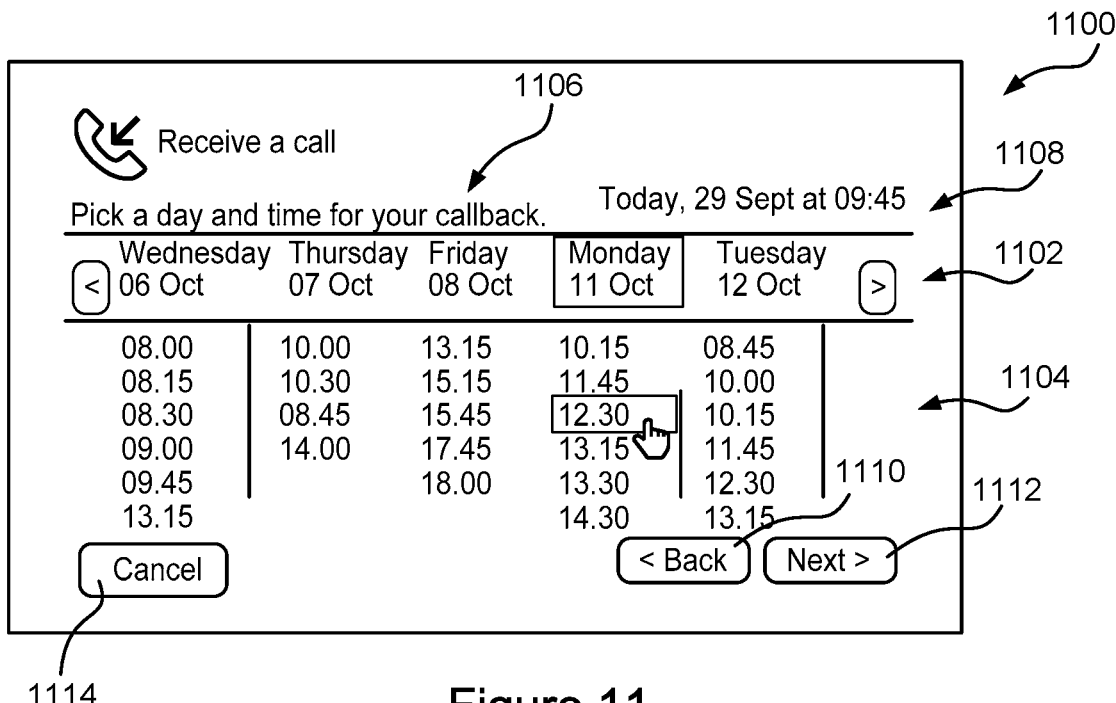
FIG. 11 is a screenshot of an example receive call screen of a receive a call widget displayed by the UI.

FIG. 11 is a screenshot of an example receive call/callback screen 1100 of a receive a call widget 202(1-*n*) displayed by the UI 200. The customer can pick a day 1102 and a time 1104 of the call/callback. The days 1102 and times 1104 can be separated into columns 1106. The call/callback screen 1100 can also display the current day and time 1108. The customer can navigate through different appointment screens receive call screens 1100 using the back button 1110 or next button 1112, e.g., to book the call/callback appointment. The customer can cancel the search for a call/callback day and time using the cancel button 1114. With the message bus 206 managing connections to the widgets 202(1-*n*), the information, views, structure, etc. can be easy be updated and/or changed.

Figure 12:
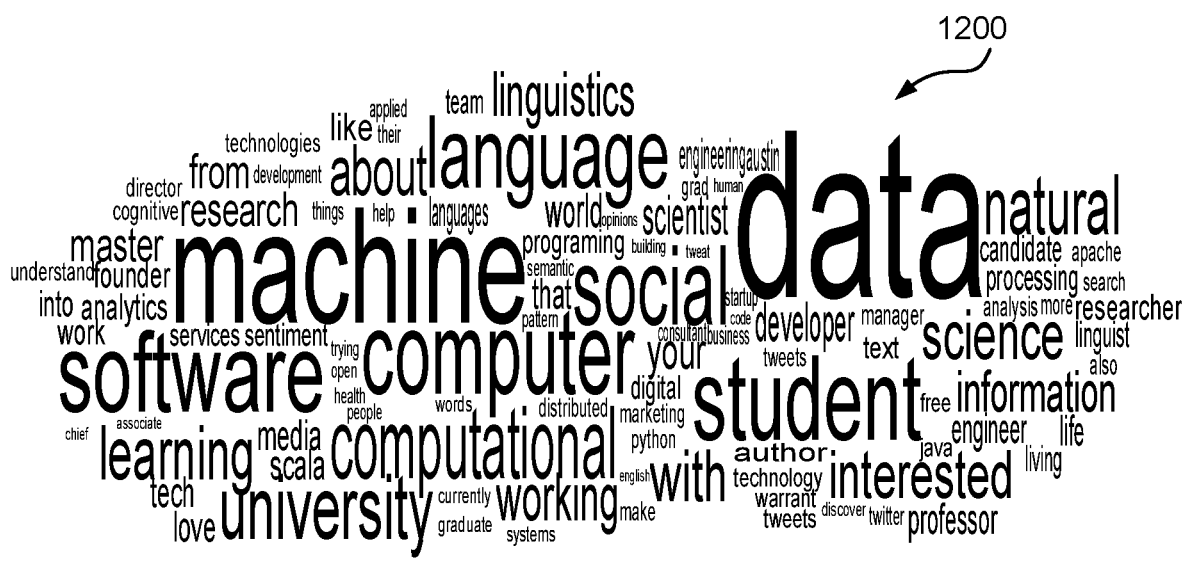
FIG. 12 is an example screenshot in a dynamic context driven user interface.

FIG. 12 is an example screenshot 1200 in a dynamic context driven user interface. For the sake of explanation the dynamic context driven user interface is implanted in the UI 200 described above, but the UI 200 need not be dynamically context driven and the dynamic context driven features can be implemented in other types of user interfaces. In some embodiments, the UI 200 is displayed at agent stations 127(1-*n*) of the contact center 115. In some embodiments, the UI 200 is displayed on the browser of a customer. Additionally or alternatively, the UI 200 can be part of a computer based program. The UI 200 can provide dynamic adjustment of the view presented to the customer and/or agent station 127(1-*n*) for various contexts, including, but not limited to, adjusting the menu and/or view to the job, e.g., function, of the agent station 127(1-*n*) in the given situation, dynamically enabling menu/control capability for a variety of UI elements, adjusting the UI 200 based on an element value, e.g., a number greater than a determined threshold, adjusting the UI 200 based on a technical, or other, ability of the agent station 127(1-*n*) to perform certain operation, and/or adjusting the UI 200 to an operational path/history, e.g., based on previous operations.

In one example, the word cluster in the screenshot 1200 of FIG. 12 is a graphical way to present a menu of the UI 200, e.g., to attract the user's attention to determined words, features, phrases, etc. In some embodiments, the UI 200 can dynamically adjust word cluster items depending on a user's tasks and status of the contact center 115 the user is interacting with. The UI 200 can change a size of the words, e.g., menu items, where larger items may be more important than smaller items. Additionally or alternatively, the UI 200 can utilize color coding/bolding to indicate urgency, e.g., red/bold may be more important than green/un-bolded text. The UI 200 may change a placement of the item or text, e.g. move the item or text to the center of the display if more important/relevant for given situation. The UI 200 can be customizable, e.g. layout, placement, etc. A complexity of the layout and placement of the elements of the UI 200 can be varied to provide different types of customer experiences. Some customers may prefer a less complex layout than others. For example, for an application for managing complex device, e.g., a maintenance manual for a telecommunication switch, the UI 200 can learn from history a relevance of certain operations for given deployment, and learn from previous operations, what works and what does not. In one example, the contact center 115 may learn that one color of widget **202(1-*n*) is selected by agent stations 127(1-*n*) more than another color of widget 202(1-*n*). Additionally or alternatively, the learning may divided into determined groups, e.g., Europe prefers one color and Asia prefers another color. The contact center 115 can use the colors to highlight, or un-highlight, selected widgets 202(1-*n*) to the agent stations 127(1-*n*)**.

Figure 13:
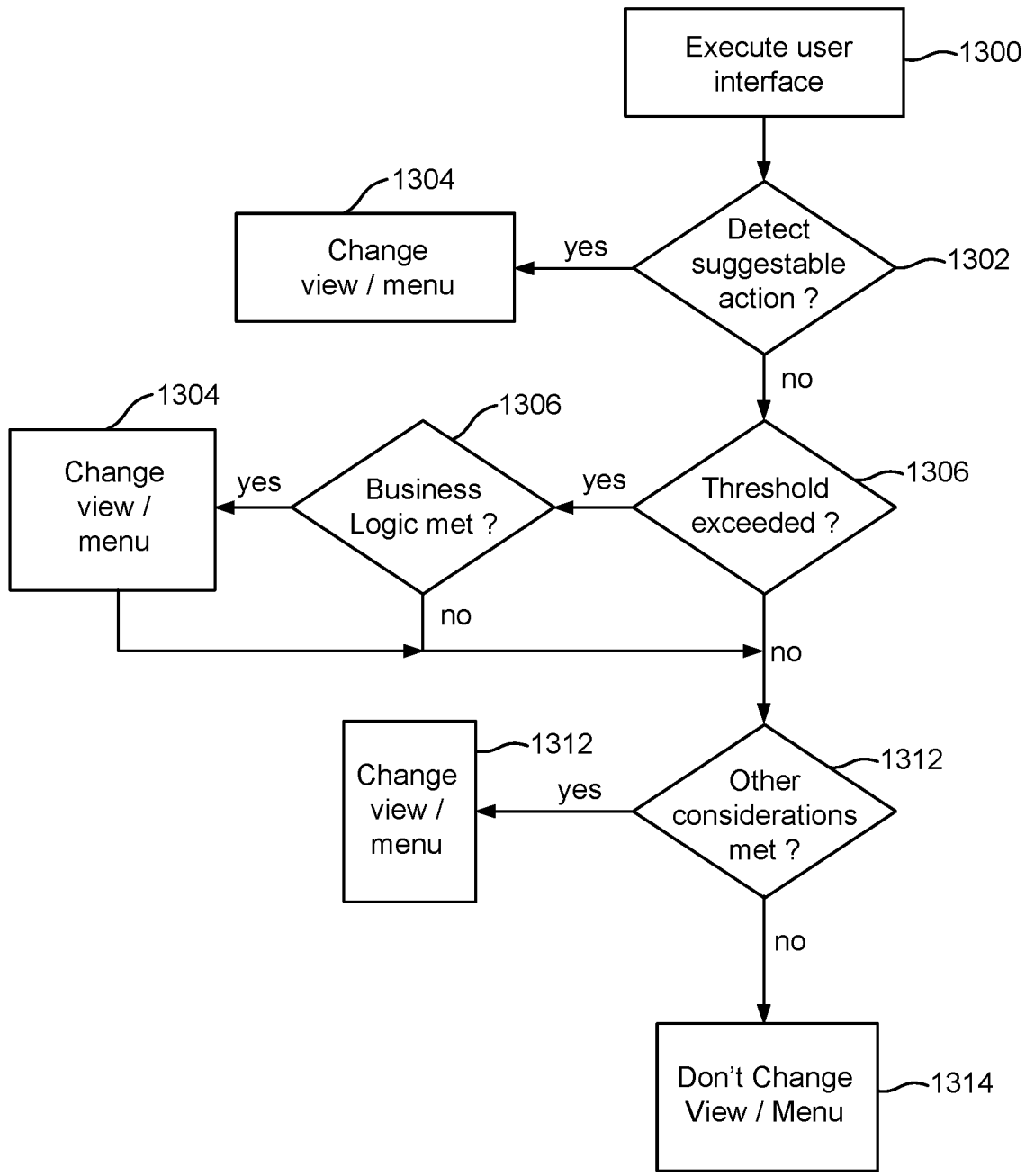
FIG. 13 is a flowchart of an example logic for dynamic context driven UI.

FIG. 13 is a flowchart of an example logic for dynamic context driven UI 200. In one example, the UI 200 can execute on the agent station **127(1-*n*). In some embodiments, the dynamically adjusted UI 200 can change the views and/or menu structure (1304) based on detecting a suggestibility of actions (1302), e.g., "you may want to adjust your routing strategy," which provides dynamic contextuality (real time state of the contact center 115), not just static contextuality (what is the user role and typical actions for this resource for that type of user). Additionally or alternatively, the UI 200** can communicate context in a prioritized manner, extending the suggestibility to bring user attention to the decision support prioritization determination of the suggestions, e.g., by positioning highest priority items at the top of a list, in bigger font type, in bold type, and/or in a different color, etc.

In some embodiments, the UI 200 can dynamically take into consideration business logic and status to ensure its met (1308) to provide a prescriptive menuing: a) current physical context such as time, e.g., it may not make sense to add additional customer service representatives in the last half hour of a shift, even if thresholds may be exceeded (1306); and other considerations (1312), including but not limited to b) status of a resource beyond simplistic considerations like enabled/disabled to include more sensitive considerations like current load on that resource, historical performance of that resource, historical impacts of actions on that resource, current and historical performance trends on that resource, etc.; c) relationships of that resource such as how might action on this resource indirectly impact status of other resources such as by distribution of work load; d) business risk considerations of status of that resource such as potential increase in costs of actions or dangerous side effects; and e) a user's history of preferred actions under similar circumstance or as mentioned when they view this screen after following a certain "breadcrumb" path through the UI 200, e.g., when going to an agent scheduling screen from an agent performance warning screen, the user may be more likely to want to remove that agent from a future schedule. If any of the determined considerations are not met, the view or menu may not be changed (1314).

In some embodiments, the UI 200 can apply contextual business logic, e.g., that of a decision support system including Rules by GENESYS TELECOMMUNICATIONS SYSTEMS, INC., and utilize that in real time decision making on potential user action offered by rendering the UI 200. This opens data feeds for actual presentation of the renderings. For example, the contact center 115 can determine based on stored information about customer preferences that the customer prefers a hands-on approach. In that case the UI 200 can highlight to the agent station **127(1-*n*) determined hands-on type widgets 202(1-*n*), for example, co-browse and chat widgets, as suggested options. The contact center 115 can determine that another customer is uncomfortable with digital based interactions, and the agent station 127(1-*n*) can be presented with a voice call option highlighted, etc. In another example, contact center 115 determined preferred interaction types can be based on agent station 127(1-*n*) availability, e.g., whether to call, co-browse or chat based on available agents at the time. The contact center 115 can also learn over time preferred ways for the agent station 127(1-*n*) to interact with customers, e.g., based on a user's actions at the agent station 127(1-*n*). In some embodiments, the UI 200 can prioritize the actions based on suggestion scoring. In some embodiments, the UI 200 can structure recommendations in categories with suggestibility contained. In some embodiments, the UI 200 can highlight choices using bold/color, code/set font size, etc. based on the suggestion scores. In some embodiments, the UI 200 can include confirmation dialogs based on low suggestion scores, e.g., to confirm a choice of a selected widget 202 (1-*n*) at the agent station 127(1-*n*). Additionally or alternatively, the UI 200 can categorize options into the visual word map of FIG. 12 to attract the agent stations 127(1-*n*)** attention based on an associated actions network.

In one example, the UI 200 can dynamically adjust to a user's function based on the context of the situation. In addition to a user's role, which may be governed by role-based access control (RBAC), a user can set his function for letting the contact center 115 adjust the UI 200. For example, a supervisor of the contact center 115 has a certain menu system and set of views associated with his role. While checking agent's occupancy, the supervisor can be interested in different aspects. For example, a group leader can be more interested in fair distribution of work, while a workforce manager is interested in agents' schedule adherence, or available spare capacity. The views of the UI 200 presented to the users are dynamically adjusted to those topics of interest associated with user's function, while RBAC controlled access to objects and management capabilities remain the same.

When inspecting elements of the UI 200, e.g., a value presented in a table, the contact center 115 can evaluate the user's interest associated with his function or assigned tasks. The assigned tasks may be retrieved, for example, from the workforce management server 135. The contact center 115 can also evaluate the currently available ways to navigate (zoom in/out) in the UI 200, the ways to perform operations on underlying objects which drive the UI 200, etc. For example, when a contact center 115 group leader inspects a particular occupancy field the UI 200 can determine that the value is rather high, and display a menu offer to edit the routing strategy as the likely root cause. At the same time, when a contact center 115 workforce manager inspects the value another menu of the UI 200 may be offered for intra-day schedule adjustment.

In some embodiments, the UI 200 view can be path/history dependent. The user can navigate to current situation in various ways, and the path may be relevant to what is important to deal with. In some embodiments, the dynamically driven context can be applied to contexts other than the UI 200, e.g., to chat and voice. In some embodiments, the UI 200 can integrate with a customer's vendor relationship management (VRM) system, or the VRM can be shared with other customers. In some embodiments, the dynamically driven UI 200 can be applied also to user interfaces with icon based menus, e.g., as described above. The UI 200 can be integrated with wearables to provide input on what actions are appropriate at given point in time. The UI 200 can allow reaching out to the contact center 115 by enabling the customer to control certain processing at the contact center 115, e.g. actively reserving a particular agent station 127(1-n).

Figure 14:
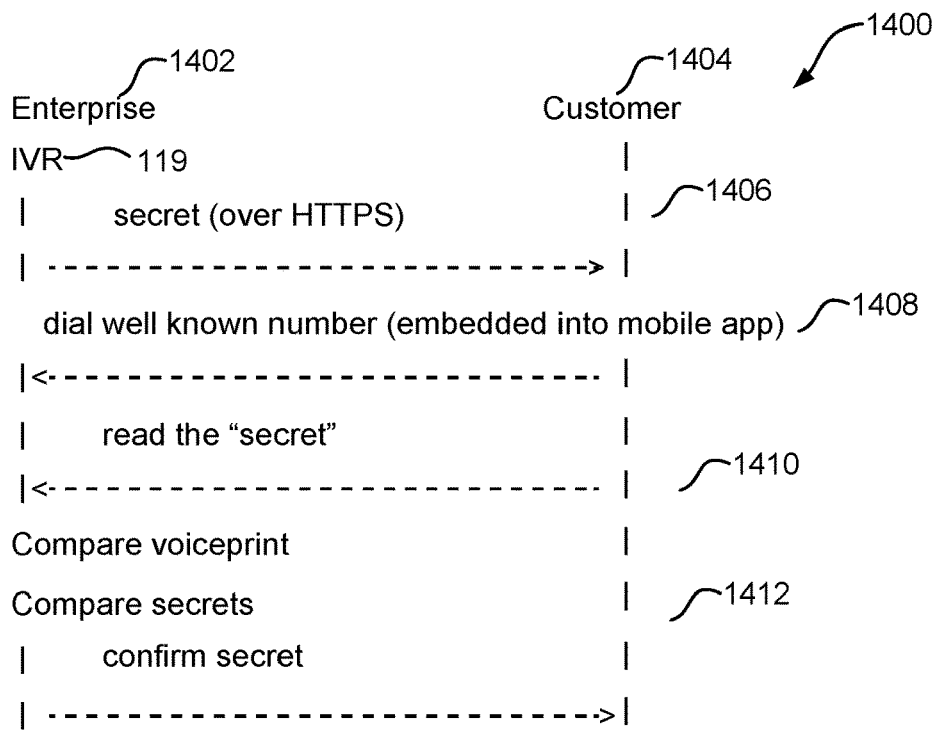
FIG. 14 is a flow diagram of an example communication between an enterprise and a customer to prevent a man-in-the-middle attack.

FIG. 14 is a flow diagram 1400 of an example communication between an enterprise 1402 and a customer 1404 to prevent a man-in-the-middle attack. The enterprise 1402 can include a contact center 115 or other enterprise and the customer 1404 can include another entity. In some embodiments, the communications occur when the customer 1404 is logging into a widget described above. The secure communication can be used in various implementations, however, including but not limited to any secure communication between parties exchanging a secret for authentication or encryption. The secure communication can be applied to scenarios requiring reliable exchange of data including but not limited to situations involving a social security number (SSN), credit card number, bank account number, phone number to call or uniform resource locator (URL) to connect to. The customer 1404 can use the land-line devices 104(1-n), IP-enabled devices 108(1-n), mobile devices 111, 112, etc. to make the call. In some embodiments, the secure communication reduces exposure to the man-in-the-middle attack within a contact center 115 equipped with IVR 119 functionality. In some embodiments, the contact center 115 uses a voice channel to verify the secret sent through another communication channel, e.g., a chat or another mobile application. In some embodiments, the secret is sent by voice and verified digitally. Any number of combinations of using different channels to send and receive the secret are possible. Biometrics other than voice can be used for verify an origin of the received secret, including but not limited to fingerprint or handprint recognition, retina scanning, iris scanning, facial recognition, handwriting recognition, etc.

The communication between the customer 1404 and the enterprise 1402 may need to be secured for various reasons. For example, sensitive data may need to be exchanged between the enterprise 1402 and the customer 1404. To secure the communication, the IVR 119 sends a secret to the customer 1404, e.g., over hypertext transfer protocol secure (HTTPS) via a web browser or mobile application of the enterprise 1402, etc. displayed to the customer 1404 by the IP-enabled devices 108(1-b), mobile devices 110, 111, 112, etc. (1406). The secret can include one or more of a number, textual information, an image, etc. In some embodiments, the customer 1404 can return the secret by dialing a known telephone number of the enterprise 1402, e.g., a telephone number that is embedded into a mobile application of the enterprise 1402 when the secret is sent, etc. The IVR 119 answers the call from the customer 1404 and the customer 1404 verbally reads the secret to the enterprise 1402 that the enterprise 1402 sent to the customer 1404 (1410). The IVR 119 confirms the relayed secret was correct by comparing the spoken secret to the secret on record at the enterprise 1402 that the enterprise 1402 sent to the customer 1404. If the spoken secret matches the secret on record, the IVR 119 can further confirm an identity of the customer 1404 by comparing a known voiceprint of the customer 1404, which may have been obtained in advance of the call. Additionally or alternatively, after the IVR 119 transfers the customer 1404 to an agent station 127(1-n) of the enterprise 1402, the agent 1502 talking to the customer 1404 may be able to recognize a voice of the customer 1404. The IVR 119 can be equipped and programmed to perform Zimmerman real-time transfer protocol (ZRTP) key (short authentication string) validation with the customer 1404. The IVR 119 system can reject the short authentication string validation with the customer 1404 if the voice does not match the customer's voice profile stored at the enterprise 1402.

Figure 15:
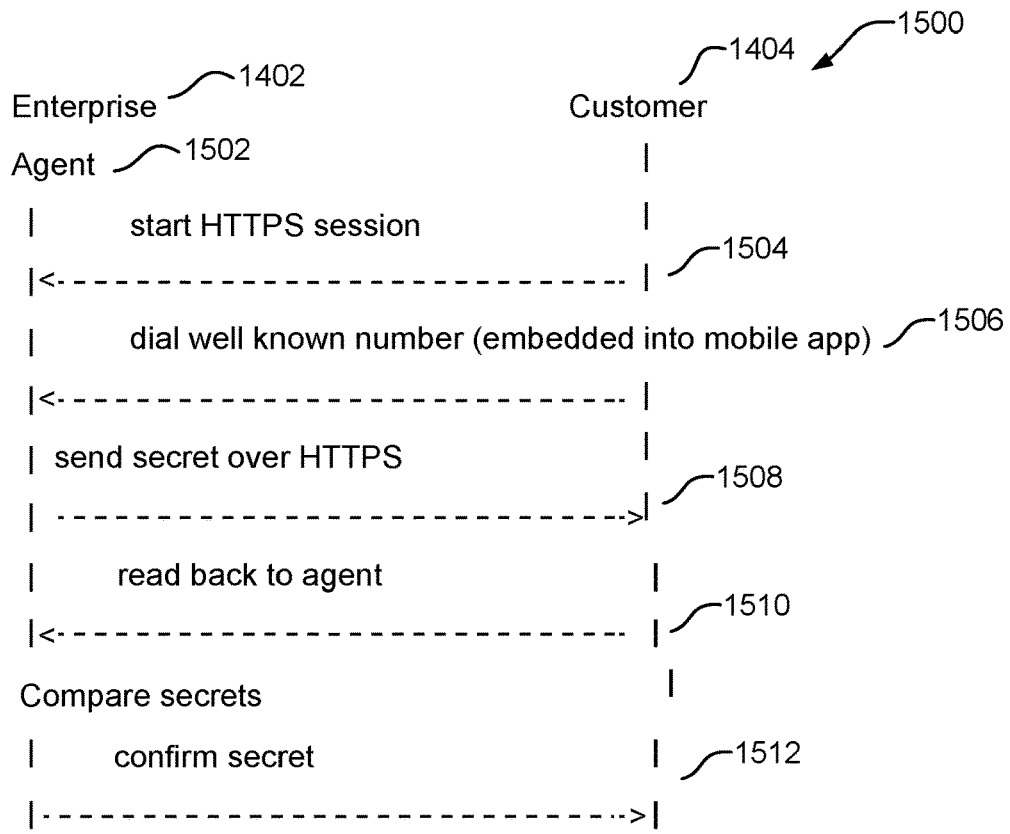
FIG. 15 is a flow diagram of another example communication between an enterprise and a customer to prevent a man-in-the-middle attack.

FIG. 15 is a flow diagram 1500 of another example communication between an enterprise 1402 and a customer 1404 to prevent a man-in-the-middle attack. The customer 1404 can initiate a communication with the enterprise using an HTTPS session, for example by connecting with a website of the enterprise 1402 over a web browser or connecting using a mobile application of the enterprise 1402, etc. The web browser and/or mobile applications can be displayed by the IP-enabled devices 108(1-b), mobile devices 110, 111, 112, etc. (1504). The website or mobile application can instruct the customer 1404 to dial an enterprise known telephone number of the enterprise 1402, e.g., one that is embedded into the mobile application.

Two distinct channels are used to secure against a man-in-the-middle attack, e.g., a voice channel and a data channel. The agent station 127(1-n) sends a secret to the customer 1404 over HTTPS (1508). The customer 1404 reads back the secret over the voice channel (1510). The agent station 127(1-n) confirms the secret matches that the secret that was sent before sharing any sensitive information with the customer 1404 and/or connecting the customer 1404 to the widget, etc. (1512). The agent 1502 talking to the customer 1404 may also be able to recognize a voice of the customer 1404. Using both data and voice to secure the communication can decrease the risk for a man-in-the-middle attack, especially if parties already have prior knowledge of each other, at least in one direction. Using voice, the data communication can be secured to share data including but not limited to the widget connections, a URL, which can be pushed from the enterprise 1402 to the customer 1404, for a document such as partially prefilled application form, a report of recent transactions, and/or a new set of one-time security codes, etc.

The contact center 15 and accompanying systems may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A system, comprising:
a message bus configured to connect with a plurality of widgets, the message bus including a processor and a memory, wherein the memory stores instructions, which when executed by the processor causes the processor to:
receive a request from a first widget of the plurality of widgets to subscribe to an event from a second widget of the plurality of widgets prior to the second widget registering with the message bus, wherein the request fails to invoke a runtime exception;
receive registration of the second widget after receipt of the request from the first widget to subscribe to the event from the second widget;
receive an event from the second widget;
transmit a request to a graphical user interface to take action with respect to the first widget in response to receipt of the event;
after receipt of the event from the second widget, receive a request from a third widget of the plurality of widgets to subscribe to the event; and
in response to receipt of the request from the third widget, automatically re-publish the event for receipt of the event by the third widget.

2. The system of claim 1, wherein each of plurality of widgets comprise a plugin.

3. The system of claim 2, further including the graphical user interface, wherein the graphical user interface connects the message bus with the plurality of widgets.

4. The system of claim 1, where features of the plurality of widgets are dynamically adjusted based on which of the plurality of widgets are connected with the message bus.

5. The system of claim 4, where features of the plurality of widgets are dynamically adjusted based on a given usage context.

6. The system of claim 5, where the context comprises a suggestable action.

7. The system of claim 5, where the context comprises a business logic.

8. The system of claim 1, where the message bus further includes an interface to connect the graphical user interface with the message bus.

9. The system of claim 1, where the instruction when executed by the processor further causes the processor to register the first widget.

10. The system of claim 1, where the instruction when executed by the processor further causes the processor to register a view.

11. A method, comprising:
connecting, with a processor, a message bus with a plurality of widgets;
receiving, by the message bus, a request from a first widget of the plurality of widgets to subscribe to an event from a second widget of the plurality of widgets prior to the second widget registering with the message bus, wherein the request fails to invoke a runtime exception;
receiving, by the message bus, registration of the second widget after receipt of the request from the first widget to subscribe to the event from the second widget;
receiving, by the message bus, for an event from the second widget;
transmitting, by the message bus, a request to a graphical user interface to take action with respect to the first widget in response to receipt of the event;
after receipt of the event from the second widget, receiving, by the message bus, a request from a third widget of the plurality of widgets to subscribe to the event; and
in response to receipt of the request from the third widget, automatically re-publish the event, by the message bus, for receipt of the event by the third widget.

12. The method of claim 11, wherein each of plurality of widgets comprise a plugin.

13. The method of claim 12, further including the graphical user interface, the graphical user interface connecting the message bus with the plurality of widgets.

14. The method of claim 11, further comprising dynamically adjusting features of the plurality of widgets based on which of the plurality of widgets are connected with the message bus.

15. The method of claim 14, where features of the plurality of widgets are dynamically adjusted based on a given usage context.

16. The method of claim 15, where the context comprises a suggestable action.

17. The method of claim 15, where the context comprises a business logic.

18. The method of claim 11, further including connecting the graphical user interface with the message bus through an interface.

19. The method of claim 11, further comprising registering a view.

* * * * *